US012697772B2

(12) United States Patent
Chares

(10) Patent No.: US 12,697,772 B2
(45) Date of Patent: *Aug. 4, 2026

(54) PROCESS FOR THREE-DIMENSIONAL PRINTING WITH VARIABLE CROSS-SECTION

(71) Applicant: SAFRAN HELICOPTER ENGINES, Bordes (FR)

(72) Inventor: Laurent Chares, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 22 days.

This patent is subject to a terminal disclaimer.

(21) Appl. No.: 18/999,962

(22) Filed: Dec. 23, 2024

(65) Prior Publication Data

US 2025/0121562 A1     Apr. 17, 2025

Related U.S. Application Data

(63) Continuation of application No. 17/595,030, filed as application No. PCT/FR2020/050837 on May 20, 2020, now Pat. No. 12,208,576.

(30) Foreign Application Priority Data

May 21, 2019    (FR) ...................................... 1905323

(51) Int. Cl.
B29C 64/209      (2017.01)
B29C 64/118      (2017.01)
B29C 64/227      (2017.01)
B33Y 10/00       (2015.01)
B33Y 30/00       (2015.01)

(52) U.S. Cl.
CPC .......... B29C 64/209 (2017.08); B29C 64/118 (2017.08); B29C 64/227 (2017.08); *B33Y 10/00* (2014.12); *B33Y 30/00* (2014.12)

(58) Field of Classification Search
CPC ........................... B29C 64/118; B29C 64/209
See application file for complete search history.

(56) References Cited

U.S. PATENT DOCUMENTS

2017/0182701 A1*   6/2017  Ryan ....................... B29C 48/92

FOREIGN PATENT DOCUMENTS

CN        204622625 U  *  9/2015  ............. B29C 67/00
CN        108501377 A  *  9/2018  ........... B29C 64/268

* cited by examiner

*Primary Examiner* — James Sanders
(74) *Attorney, Agent, or Firm* — WOMBLE BOND DICKINSON (US) LLP

(57)                ABSTRACT

A process for three-dimensional printing of a workpiece including a succession of steps for producing a layer of the workpiece by means of a nozzle which has an output cross-section along a path of the nozzle, wherein, during at least one step for producing a layer, use is made of at least one nozzle, an output portion of which has an output cross-section which is variable between a first maximum cross-section and a second minimum cross-section, and wherein the cross-section of at least one part of an output portion of the nozzle is varied along at least one portion of the path.

6 Claims, 3 Drawing Sheets

PROCESS FOR THREE-DIMENSIONAL PRINTING WITH VARIABLE CROSS-SECTION

TECHNICAL FIELD OF THE INVENTION

The invention relates to a method of three-dimensional printing of a part.

The invention relates more particularly to a three-dimensional printing method referred to as "fused deposition" made from a thermoplastic filament previously heated and liquefied by a heating element in order to liquefy it, and deposited by means of a nozzle in order to form layers of the part to be produced.

BACKGROUND

A fused deposition 3D printing method involves passing a thermoplastic filament through a print head comprising a heating element and a calibrated nozzle. A spool of thermoplastic filament supplies the heating element which liquefies this filament. The spool pushes the filament through the heating element to a calibrated nozzle through which it emerges as a more or less liquid filament, calibrated according to a cross-section of the nozzle. The simultaneous movement of the head along a determined path allows to create a layer of the part under construction. By stacking successive layers, solid or honeycombed, the desired part is created.

The calibrated nozzles are usually removable so as to allow a choice of print quality. The smaller the outlet cross-section of the nozzle, the finer the print can be and the more accurately the details of the part can be printed, but the slower the print speed. Conversely, the larger the outlet cross-section of the nozzle, the coarser the print, but the faster it can fill large areas with a high printing speed.

Currently, there is no possibility to change the nozzles during printing. The choice of the nozzle must be made before the start of printing so that the printing of a part is the result of a compromise performed before printing between the fineness of the print, produced by means of a nozzle with a small cross-section, and the speed of printing, produced by means of a nozzle with a larger cross-section.

This design does not allow for optimal printing.

Indeed, if a nozzle with a small cross-section is chosen, it allows the printing of details arranged close to free edges of the part, but the filling of the portions of the part which are not arranged close to free edges of the part is performed very slowly. This results in a long production time for the part.

Conversely, if a nozzle with a large cross-section is chosen, it allows rapid filling of the portions of the part which are not arranged close to the free edges of the part, but does not allow the details arranged close to the free edges of the part to be printed with satisfactory quality. In addition to the time required for the rapid production of the part, there is also the time required for a finishing step allowing to obtain the desired details.

To remedy these drawbacks, printing methods using nozzles of variable cross-section have been proposed in documents PT-109.947-A, US-2017/182.701-A1, CN-108.237.690-A1, DE-10.2017.207.291-A1. However, these documents do not describe a method for obtaining a precise outline of the manufactured part.

SUMMARY OF THE INVENTION

The invention remedies these disadvantages by proposing a three-dimensional printing method implementing a nozzle whose cross-section is variable during printing according to an innovative method.

For this purpose, the invention proposes a method for printing three-dimensionally a part, comprising a succession of steps during each of which a solid or honeycomb layer of the part to be obtained is produced, each of these steps comprising passing a thermoplastic filament through a heating element to liquefy it, then passing the liquefied thermoplastic filament through at least one nozzle having an outlet cross-section, then depositing the liquefied thermoplastic filament coming out of said at least one nozzle and simultaneously moving said at least one nozzle along a determined path, the entirety of which corresponds to the layer of the part to be obtained, wherein, during at least one step of producing a layer by filling, use is made of a said at least one nozzle, an outlet segment of which has an outlet cross-section that can vary between a first, maximum cross-section and a second, minimum cross-section, and in that the cross-section of at least one portion of said outlet segment of said at least one nozzle is made to vary along at least one portion of the determined path, so as to construct an outer wall delimiting the layer, characterized in that it comprises an initial step of producing a layer, prior to said at least one step of producing a layer by filling, during which said at least one nozzle having its second minimum cross-section is used to deposit an outline of said layer.

According to other characteristics of the method:

during the step of producing a layer by filling, the first cross-section of the nozzle is used along at least one first portion of the path associated with a solid portion of the part free of details, during the step of producing a layer by filling, the second cross-section of the nozzle is used along at least one second portion of the path associated with a portion of the part comprising details, this second portion being located in the vicinity of a free edge of the part, during the step of producing a layer by filling, at least one cross-section of the nozzle is used which is intermediate between the first and second cross-sections along at least a third portion of the intermediate path between the first and second portions, The invention also relates to a printing nozzle for three-dimensional printing from a thermoplastic filament, said nozzle comprising a body in which is formed a conduit comprising at least one inlet segment which is configured to be supplied with previously liquefied thermoplastic filament and one outlet segment of maximum cross-section, said nozzle comprising movable means for reducing the cross-section of the outlet segment toward a minimum cross-section, the movable reduction means comprising a housing which opens into the outlet segment of the nozzle and inside which a tray is movable between a position retracted into the housing associated with the maximum cross-section of the nozzle and an extended position in which it protrudes into the outlet segment of the nozzle in order to reduce its cross-section toward the minimum cross-section, a free end of the tray being, in its extended position, located at the level of an outlet orifice of the outlet segment of the nozzle, characterized in that the conduit, the housing and the tray are substantially cylindrical and an axis of the housing and of the tray forms a given angle with an axis of the outlet segment of the conduit.

According to another feature of the nozzle, the maximum cross-section is at least four times greater than the minimum cross-section.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figures 1, 2, 3:
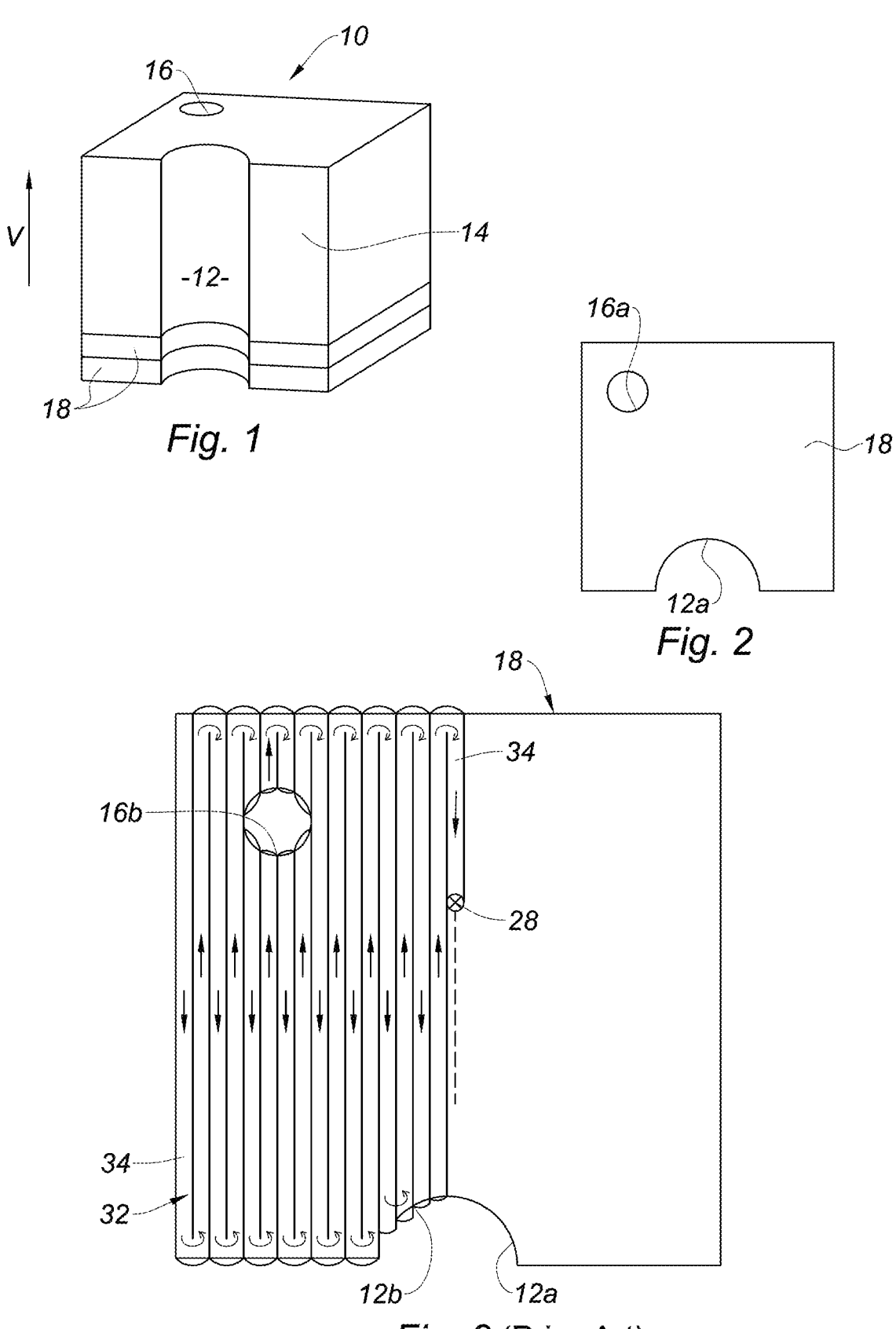
FIG. 1 is a very schematic perspective view of a part made by a three-dimensional printing method.
FIG. 2 is a very schematic view of a layer of the part shown in FIG. 1.
FIG. 3 is a very schematic view of the path followed by a conventional nozzle of reduced cross-section to produce the layer of FIG. 1.

FIG. 1 shows very schematically a part 10 produced by three-dimensional printing.

The part 10 is here a cube comprising, in the vertical direction V, a semi-cylindrical notch 12 which opens into one of its faces 14, and a bore 16.

The part 10 is obtained by a three-dimensional printing method mainly comprising a succession of steps during each of which a solid or honeycomb layer 18 of the part to be obtained of the type shown in FIG. 2 is produced by filling. The layers 18 are thus stacked on top of each other along the vertical direction V to obtain the final part 10. Each layer 18 thus comprises a notch 12a, the stack of the notches 12a forming the notch 12. Similarly, each layer 18 comprises a circular opening 16a, the stack of circular openings 16a forming the bore 16.

Figures 4, 5, 6:
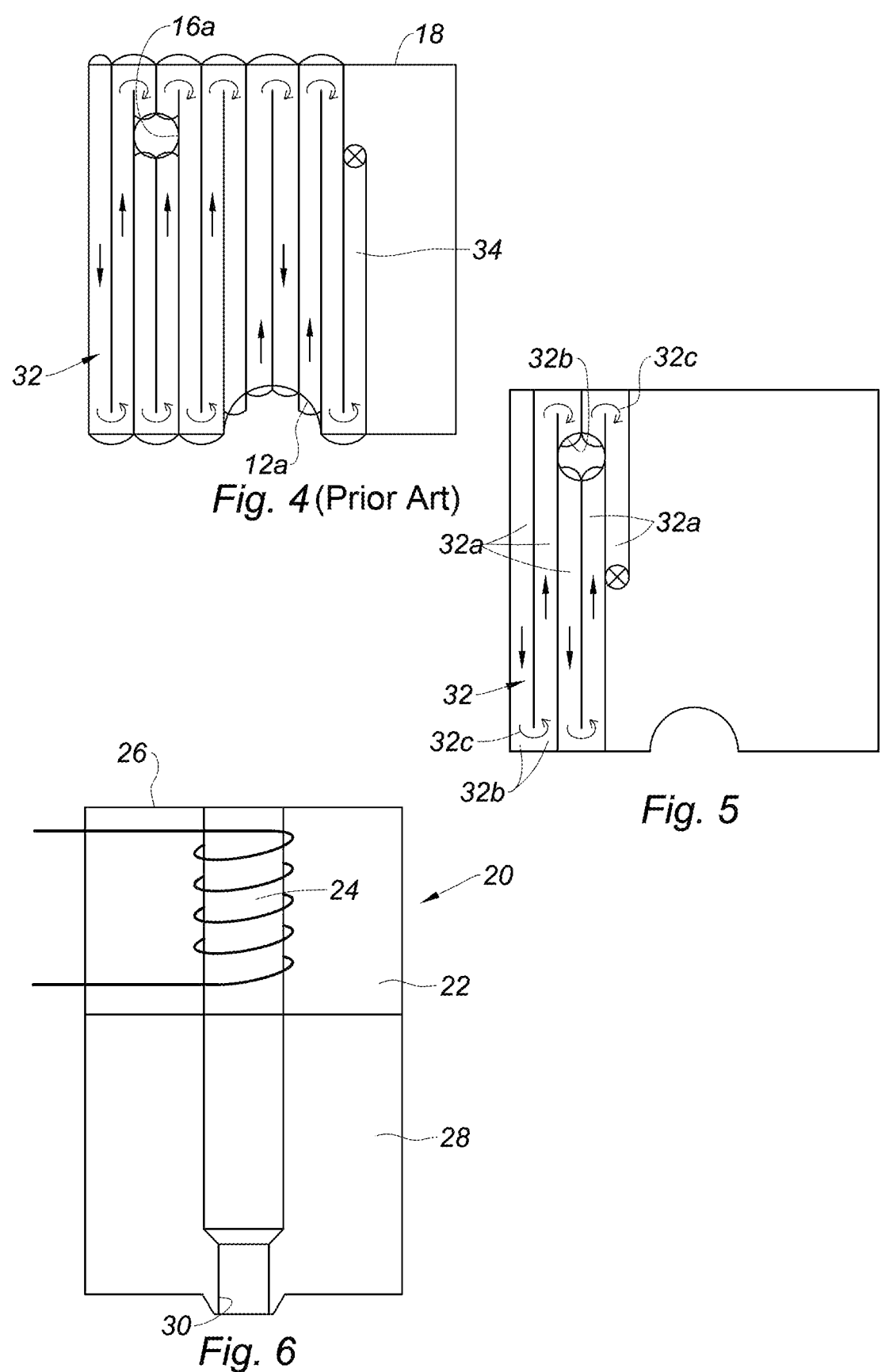
FIG. 4 is a very schematic view of the path followed by a conventional nozzle with a large cross-section to produce the layer of FIG. 1.
FIG. 5 is a very schematic view of the path followed by a nozzle according to the invention with a large cross-section to produce the layer of FIG. 1.
FIG. 6 is a schematic cross-sectional view of a print head comprising a nozzle according to the prior art.

Each of these steps of producing a layer 18 by filling is carried out by means of a print head 20 which has been schematically shown in FIG. 6.

The head 20 substantially comprises a heating element 22 comprising a heated bore 24, one end 26 of which is intended to be supplied with a thermoplastic filament provided by a spool (not shown). The filament passes through the heating element 22 until it is liquefied and then is conveyed out of the heating element to a nozzle 28, an outlet orifice 30 of which has an outlet cross-section of determined surface area. The head 20 is moved along a determined path 32 on the layer 18, the entire path 32 corresponding to the layer 18 of the part 10 to be obtained, so that the liquefied thermoplastic filament coming out the nozzle 28 is deposited along this path.

The nozzle 28 has, as noted, a specific outlet cross-section of determined surface area. Depending on the amount of this surface area, a bead of greater or lesser width of liquefied thermoplastic filament may be deposited along the path 32 to form the layer 18, as illustrated in FIGS. 3 and 4.

Depending on the size of the surface area of the outlet cross-section of the nozzle 28, this deposition is also carried out with a higher or lower flow rate of thermoplastic filament. The speed of movement of the head 20 is also dependent on this flow rate, as it is adjusted accordingly to provide an even deposit of liquefied thermoplastic filament along the path 32.

Classically, the production of a layer 18 according to a three-dimensional printing method known to the prior art is performed by means of a single nozzle 28, the size of which, i.e. the cross-section of passage, is chosen before printing and maintained throughout the printing.

FIG. 3 thus illustrates, superimposed on the shape of the layer 18 of the part, an already completed portion 34 of the path 32 made by a nozzle 28, whose position has been represented schematically by a cross. This configuration corresponds to a nozzle 28 with a reduced cross-section.

In a non-limiting manner, the path 32 may cover the layer 18 so as to only minimally interrupt the deposition of the liquefied thermoplastic filament. To do this, the nozzle follows the path 32 back and forth across the surface of the layer 18, interrupting the deposition of the liquefied thermoplastic filament only for detailing, i.e., in this case, for making the notch 12a and the circular opening 16a.

As can be seen, due to the reduced cross-section of the nozzle 28, the number of round trips performed by this one to traverse the layer 18 is high, and as a result, the time required to produce the layer 18 is high. On the other hand, the reduced cross-section of the nozzle 28 allows fine details to be produced. For example, excess thermoplastic filament 12b on the surface of the notch 12a and 16b on the surface of the circular opening 16a are only very small in thickness, which thickness has been exaggerated in FIG. 3 for visibility. Therefore, with a nozzle 28 of reduced cross-section, little or no machining rework is required to produce the surfaces of the notch 12a or of the circular opening 16a.

FIG. 4 illustrates, superimposed on the shape of the layer 18 of the part, an already completed portion 34 of the path 32 made by a nozzle 28 of high cross-section.

As can be seen, due to the high cross-section of the nozzle 28, the number of round trips made by this one to traverse the layer 18 is reduced, and hence the time taken to complete the layer 18 is reduced 18, as the filling of the portions of the layer 18 free of detail can be performed quickly.

On the other hand, the reduced cross-section of the nozzle 28 does not allow for fine detailing. For example, the excess thermoplastic filament 12b on the surface of the notch 12a and 16b on the surface of the circular opening 16a are of high thickness and extend well beyond the surface 12b of the notch 12a and the surface 16b of the circular opening 16a. As a result, the use of a nozzle 28 of reduced cross-section requires rework operations by machining the surfaces 12b of the notch 12a and 16b of the circular opening 16a.

Currently, there is no possibility to change the nozzle 28 during printing. The choice of the nozzle must be made before printing is started so that the printing of a part 10 results from a compromise performed, prior to printing, between the fineness of the print, when using a nozzle 28 with a reduced cross-section, and the speed of printing, when using a nozzle 28 with a larger cross-section.

Figure 7A:
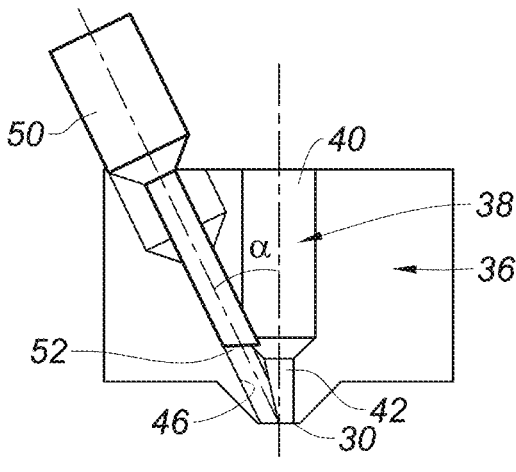
FIGS. 7A and 7B are schematic axial and cross-sectional views of a nozzle according to the invention shown in an elevated sectional position.
Figure 7B:
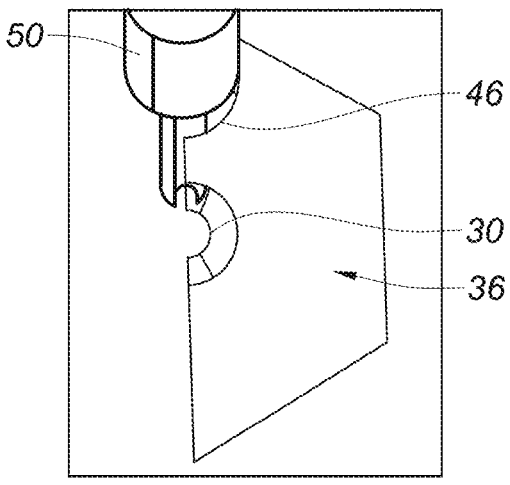

The invention remedies this disadvantage by proposing a three-dimensional printing method, comprising, as previously described, a succession of steps during each of which a layer 18 of the part 10 to be obtained is produced. In at least one step of producing a layer 18 by filling according to this method, a variable cross-section nozzle 28 of the type shown in FIGS. 7A and 7B is used.

The nozzle 28 comprises a body 36 in which is formed a conduit 38 comprising at least one inlet segment 40 which is configured to be supplied with thermoplastic filament previously liquefied by the heating element 22 previously described with reference to FIG. 6, which has not been shown in FIGS. 7A and 7B.

The conduit 38 also comprises an outlet segment 42 of maximum cross-section, terminating at the outlet orifice 30.

In accordance with the invention, the nozzle 28 comprises movable means for reducing the cross-section of the outlet segment 42 toward a minimum cross-section.

According to an alternative embodiment of the invention which could be contemplated but has not been shown, the movable reduction means of the cross-section of the outlet segment could comprise a diaphragm means arranged at the end of the outlet segment 42, i.e. at the level of the orifice 30. Such a diaphragm can take many forms, for example a movable pallet diaphragm similar to the movable pallet tuyeres used at the outlet of the fighter aircraft jet engines.

However, preferably, as illustrated in FIGS. 7A and 7B, the movable reduction means comprise a housing 46 which opens into the outlet segment 42 of the nozzle 28 and within which a tray 50 is movable. The tray 50 is movable between a retracted position in the housing 46, as shown in FIG. 7A, and an extended position, shown in FIG. 7B. The retracted position of FIG. 7A is associated with the maximum cross-section of the nozzle 28, and in the extended position of FIG. 7B, the tray 50 protrudes into the outlet segment 42 of the nozzle to reduce the cross-section of the outlet segment 42 toward the minimum cross-section.

Preferably, the conduit 38, the housing 46 and the tray 50 are substantially cylindrical. To prevent the tray 50 from entering the outlet segment 42 and disturbing the flow of the liquefied thermoplastic filament, it is necessary that this one not be arranged perpendicular to an axis A of the conduit 38. For this purpose, an axis B of the housing 46 and the tray 50 forms a predetermined angle α with the axis A of the outlet segment 42 of the conduit 38. This angle is the result of a compromise between the overall dimensions of the tray 50 and an angle α as small as possible. It is for example 30 to 45 degrees.

Figure 8A:
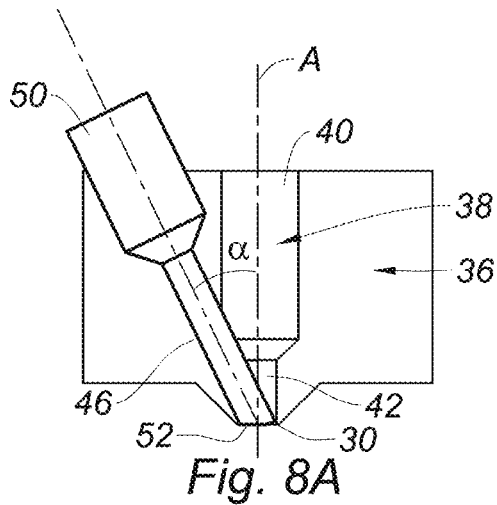
FIGS. 8A and 8B are schematic axial and cross-sectional views of a nozzle according to the invention shown in a reduced cross-section position.

Preferably, as illustrated in FIG. 8A, also in order not to disrupt the flow of the liquefied thermoplastic filament, in the extended position of the tray 50, a free end 52 of the tray 50 is located at the level of the outlet orifice 30 of the outlet segment 42 of the nozzle 28.

Figure 8B:
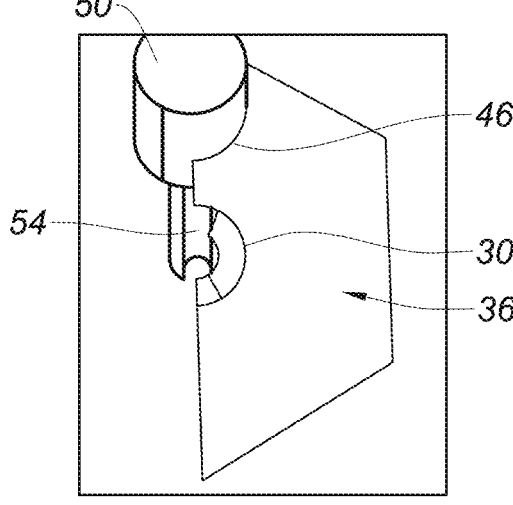

Preferably, as illustrated in FIG. 8B, the free end 52 of the tray 50, in its extended position, extends in the plane of the outlet orifice 30 of the outlet segment 42 of the nozzle 28 and along the entire cross-section of this orifice 30.

As illustrated in FIG. 8B, in order not to interrupt the flow of liquefied thermoplastic filament, the end 52 comprises a hollow tubular through cavity 54 that communicates with the outlet segment 42, so that it effects a reduction in cross-section of the outlet segment 42 without interrupting the flow of thermoplastic filament.

Ideally, the maximum cross-section of the outlet conduit of the nozzle 28 is at least four times its minimum cross-section in the extended position of the tray 50. This configuration is obviously not limiting to the invention, and different and higher maximum to minimum cross-section ratios can be envisaged. For example, a ratio of maximum to minimum cross-section of 4 is achieved for example with cross-sections of minimum 0.4 mm to maximum 0.8 mm. With cross-section ratios of minimum diameter 0.3 mm to maximum 0.9 mm or more, the ratio of maximum to minimum cross-section becomes greater than 9, for example.

The tray 50 may be moved in various ways, in particular by hydraulic or electromagnetic actuation means, without limitation of the invention.

The tray 50 is, as noted, movable between two extreme positions, retracted and extended. It will be understood that intermediate positions can be envisaged, provided that the actuation means allow it.

In this configuration, an initial step of constructing a layer is to deposit with the nozzle the outline of the layer, so as to construct an outer wall delimiting the layer. For this purpose, it is necessary to use the nozzle with its second minimum cross-section, so as to deposit an outline of said layer with a fine precision.

Then, in at least one filling step, the outline is filled in a solid manner or in a more or less dense honeycomb grid.

To this end, during at least one step of producing the layer by filling, the cross-section of at least a portion of the outlet segment 42 of the nozzle 28 is varied along at least one portion 32a, 32b of the path 32.

This means that the cross-section at the outlet of the conduit 38 is not constant, but varies according to the position of the nozzle 28, as shown in FIG. 5.

In FIG. 5, the path 32 comprises first portions 32a along which the nozzle 28 has the maximum cross-section. On these portions 32a, the tray 50 thus occupies its retracted position. These portions correspond to solid portions of the part 10, and thus of the layer 18, which is free of details. Along these portions, the nozzle 28 provides a high flow rate of liquefied thermoplastic filament and, therefore, a rapid filling of the layer.

The path 32 comprises second portions 32b along which the nozzle 28 has the minimum cross-section. On these portions 32a, the tray 50 occupies its extended position. These portions correspond to portions of the part 10, and thus of the layer 18, comprising details. These second portions are usually located near free edges of the part. Along these portions, the nozzle 28 provides a reduced flow rate of liquefied thermoplastic filament and therefore a slower filling of the part but this allows to produce intricate details.

Of course, the outlet cross-sections of the nozzle 28 are not necessarily limited to only the minimum and maximum cross-sections, but it is also possible to envisage intermediate cross-sections and even cross-sections progressively increasing or decreasing between the minimum and maximum cross-sections provided that the tray 50 can be progressively deployed between its retracted position in FIG. 7A and the extended position in FIG. 7B. Corresponding actuation means may be provided to allow the tray 50 to maintain these intermediate positions.

In this case, during the step of producing a layer 18, at least one cross-section of the nozzle 28 that is intermediate between the first and second cross-sections along at least a third portion 32c of the intermediate path between the first 32a and second portion 32b may be used.

This third portion may correspond in particular to a transition zone of the path 32 between portions 32a and 32b.

The printing method according to the invention thus allows to considerably optimize the production time of a part by reserving the minimum cross-section of the nozzle for the preparation of the outline of the part and the printing of the details and by devoting the maximum cross-section of the nozzle to the filling of the part.

The invention claimed is:

1. A printing nozzle for three-dimensional printing from a thermoplastic filament, said nozzle comprising a body in which is formed a conduit comprising at least one inlet segment which is configured to be supplied with previously liquefied thermoplastic filament and one outlet segment of maximum cross-section, wherein it comprises movable means for reducing the cross-section of the outlet segment toward a minimum cross-section, the movable reduction means comprising a housing which opens into the outlet segment of the nozzle and inside which a tray is movable between a position retracted into the housing, associated with the maximum cross-section of the nozzle, and an extended position in which it protrudes into the outlet segment of the nozzle in order to reduce its cross-section toward the minimum cross-section, a free end of the tray being, in its extended position, located at the level of an outlet orifice of the outlet segment of the nozzle, wherein the conduit, the housing and the tray are substantially cylindrical and in that an axis (B) of the housing and of the tray forms a given angle (a) with an axis (A) of the outlet segment of the conduit, the angle (a) being between 30° and 45°.

2. The printing nozzle according to claim 1, wherein the tray comprises a free end located at the level of the outlet orifice of the outlet segment of the nozzle when the tray is in the extended position.

3. The printing nozzle according to claim 2, wherein, in the extended position of the tray, the free end extends in a plane of the outlet orifice of the outlet segment of the nozzle and along the entire cross-section of said outlet orifice.

4. The printing nozzle according to claim 2, wherein the free end of the tray comprises a hollow tubular through cavity that communicates with the outlet segment of the nozzle.

5. The printing nozzle according to claim 1, wherein the maximum cross-section is at least four times greater than the minimum cross-section.

6. The printing nozzle according to claim 3, wherein the free end of the tray comprises a hollow tubular through cavity that communicates with the outlet segment of the nozzle.

\* \* \* \* \*